(12) United States Patent
Hupka et al.

(10) Patent No.: US 9,512,260 B2
(45) Date of Patent: Dec. 6, 2016

(54) STORAGE STABLE RESIN FILMS AND FIBRE COMPOSITE COMPONENTS PRODUCED THEREFROM

(71) Applicant: Covestro Deutschland AG, Leverkusen (DE)

(72) Inventors: Florian Hupka, Düsseldorf (DE); Marcel Schornstein, Neuss (DE); Dirk Wegener, Monheim (DE); Harald Rasselnberg, Dormagen (DE)

(73) Assignee: Covestro Deutschland AG, Leverkusen (DE)

(*) Notice: Subject to any disclaimer, the term of this patent is extended or adjusted under 35 U.S.C. 154(b) by 59 days.

(21) Appl. No.: 14/385,879

(22) PCT Filed: Mar. 15, 2013

(86) PCT No.: PCT/EP2013/055415
§ 371 (c)(1),
(2) Date: Sep. 17, 2014

(87) PCT Pub. No.: WO2013/139705
PCT Pub. Date: Sep. 26, 2013

(65) Prior Publication Data
US 2015/0050503 A1    Feb. 19, 2015

(30) Foreign Application Priority Data

Mar. 20, 2012 (EP) .................................... 12160309
Oct. 19, 2012 (EP) .................................... 12189156

(51) Int. Cl.
| C08G 18/32 | (2006.01) |
| B32B 27/40 | (2006.01) |
| B32B 37/16 | (2006.01) |
| C08G 18/42 | (2006.01) |
| C08G 18/72 | (2006.01) |
| B32B 27/12 | (2006.01) |
| B32B 5/02 | (2006.01) |
| C08J 5/18 | (2006.01) |
| C08J 5/24 | (2006.01) |
| C08G 18/66 | (2006.01) |
| C08G 18/76 | (2006.01) |
| B29C 70/46 | (2006.01) |

(52) U.S. Cl.
CPC ......... *C08G 18/3218* (2013.01); *B29C 70/465* (2013.01); *B32B 5/028* (2013.01); *B32B 27/12* (2013.01); *B32B 27/40* (2013.01); *B32B 37/16* (2013.01); *C08G 18/42* (2013.01); *C08G 18/6644* (2013.01); *C08G 18/72* (2013.01); *C08G 18/7664* (2013.01); *C08J 5/18* (2013.01); *C08J 5/24* (2013.01); *B32B 2250/02* (2013.01); *B32B 2262/101* (2013.01); *B32B 2305/38* (2013.01); *B32B 2305/74* (2013.01); *B32B 2375/00* (2013.01); *B32B 2419/00* (2013.01); *B32B 2603/00* (2013.01); *B32B 2605/08* (2013.01); *B32B 2605/18* (2013.01); *C08J 2375/04* (2013.01); *Y10T 428/31551* (2015.04); *Y10T 428/31601* (2015.04); *Y10T 428/31605* (2015.04)

(58) Field of Classification Search
CPC .. C08G 18/42; C08G 18/72; C08G 18/3218; C08G 18/6644; C08G 18/7664; C08J 2375/04; C08J 5/18; C08J 5/24; B32B 27/40; B32B 27/12; B32B 27/3716; B32B 5/028; B32B 2250/02; B32B 2262/101; B32B 2305/38; B32B 2305/74; B32B 2375/00; B32B 2605/08; B32B 2605/18; Y10T 429/31551; Y10T 428/31601; Y10T 428/31605
USPC .................. 428/423.1, 425.6, 425.8; 528/73; 156/307.1
See application file for complete search history.

(56) References Cited

U.S. PATENT DOCUMENTS

| 4,443,563 | A | 4/1984 | Dirlikov et al. |
| 4,564,645 | A | 1/1986 | Salzburg et al. |
| 4,797,320 | A | 1/1989 | Kopp et al. |
| 5,356,945 | A * | 10/1994 | Werner .................. C08G 18/10 521/159 |
| 2004/0231598 | A1 | 11/2004 | Werner |
| 2008/0099141 | A1 | 5/2008 | Booth et al. |
| 2009/0146463 | A1 | 6/2009 | Schleiermacher et al. |
| 2011/0281117 | A1 | 11/2011 | Ortelt et al. |
| 2012/0003890 | A1 | 1/2012 | Schmidt et al. |
| 2012/0285612 | A1* | 11/2012 | Burks ................ C08G 18/4829 156/242 |
| 2013/0045652 | A1 | 2/2013 | Schmidt et al. |
| 2013/0244520 | A1 | 9/2013 | Lindner et al. |

(Continued)

FOREIGN PATENT DOCUMENTS

| DE | 4104692 A1 | 8/1992 |
| DE | 102009001806 A1 | 9/2010 |

(Continued)

OTHER PUBLICATIONS

Office Action for U.S. Appl. No. 14/386,030 dated Jun. 17, 2015.

(Continued)

*Primary Examiner* — Thao T Tran
(74) *Attorney, Agent, or Firm* — K&L Gates LLP

(57) ABSTRACT

The invention relates to a storage-stable resin film based on polyurethane systems having a very high characteristic number and fiber-composite components (composite components, molded bodies) produced therefrom by compressing the resin film, in combination with fiber-reinforced materials such as woven fabrics and fleece, at high temperatures and under pressure, and to a method for the production thereof.

10 Claims, No Drawings

(56) References Cited

U.S. PATENT DOCUMENTS

| | | |
|---|---|---|
| 2014/0065911 A1 | 3/2014 | Schmidt et al. |
| 2014/0087196 A1 | 3/2014 | Lindner et al. |
| 2015/0050503 A1 | 2/2015 | Hupka et al. |
| 2015/0080530 A1 | 3/2015 | Hupka et al. |

FOREIGN PATENT DOCUMENTS

| | | |
|---|---|---|
| DE | 102009001793 A1 | 10/2010 |
| DE | 102010029355 A1 | 12/2011 |
| EP | 2360196 A1 | 8/2011 |
| WO | WO-9850211 A1 | 11/1998 |
| WO | WO-2006043019 A1 | 4/2006 |
| WO | WO-2012022683 A1 | 2/2012 |

OTHER PUBLICATIONS

International Search Report for PCT/EP2013/055415 mailed Jun. 7, 2013.

\* cited by examiner

STORAGE STABLE RESIN FILMS AND FIBRE COMPOSITE COMPONENTS PRODUCED THEREFROM

CROSS-REFERENCE TO RELATED APPLICATIONS

This application is a national stage application (under 35 U.S.C. §371) of PCT/EP2013/055415, filed Mar. 15, 2013, which claims benefit of European Applications No. 12160309.6, filed Mar. 20, 2012 and No. 12189156.8 filed Oct. 19, 2012, all of which are incorporated herein by reference in their entirety.

The present invention relates to storage-stable resin films based on polyurethane systems with very high index, and to fiber-composite components (composite components, moldings) produced therefrom via pressing of the resin films at elevated temperatures in combination with fiber-reinforced materials such as woven fabrics and laid scrims, and also to a process for the production thereof.

Fiber-reinforced materials in the form of prepregs are already used in many industrial applications because they are convenient to handle and because of increased processing efficiency in comparison with the alternative wet lamination technology ("wet-lay-up" technology).

Demands of industrial users of systems of this type are not only good handling, but also long shelf lives at room temperature and short cycle times, and prepreg-hardening temperatures that are low and energy-efficient.

This requires matrix components that permit the production of prepregs that can be stored and that have properties sufficiently stable for further processing. To this end, the prepregs cannot be tacky, but nor can they have been fully hardened: instead it is necessary that the resin matrix has been merely prepolymerized, i.e. it must remain fusible. Requirements placed upon the crosslinked resin matrix consist in high adhesion at interfaces in respect of the reinforcing materials and insert components, and where appropriate also in respect of other materials, for example metallic or ceramic materials. In the crosslinked state there are also requirements for high chemical stability and heat resistance.

Alongside polyesters, vinyl esters, and epoxy systems there are many specialized resins in the field of crosslinking matrix systems. Among these are also polyurethane resins, which are used by way of example for the production of composite materials by way of SRIM (structural reaction injection molding) processes or pultrusion processes because they are tough, damage-tolerant, and robust. Polyurethane composites also have superior toughness in comparison with vinyl esters, unsaturated polyester resins (UPE), or UPE-urethane hybrid resins.

Prepregs and composite components produced therefrom, based on epoxy systems, are described by way of example in WO 98/50211.

WO 2006/043019 describes a process for the production of prepregs based on epoxy resin polyurethane powders.

DE-A 102010029355 describes a process for the production of storage-stable polyurethane prepregs, and describes moldings produced therefrom, these being obtainable via a direct-melt-impregnation process from fiber-reinforced materials with use of reactive polyurethane compositions. The in essence aliphatic polyisocyanates used here are either internally blocked (e.g. as uretdione) and/or blocked by external blocking agents. The reactive resin mixtures can be used at temperatures of from 80 to 120° C. in the direct-melt-impregnation process. The disadvantage is that the hardening temperature is from 120° C. to 200° C., depending on the system, and the hardening time/cycle time is very long, being up to 60 minutes, which results in high energy costs and high production costs. The examples use a leveling additive, and it can therefore be assumed that the systems described have high viscosities.

DE-A 102009001793 and DE-A 102009001806 describe a process for the production of storage-stable prepregs in essence composed of at least one fibrous support and of at least one reactive pulverulent polyurethane composition as matrix material.

There are also known prepregs based on pulverulent thermoplastics, in particular TPU, as matrix. US-A 20040231598 describes a method in which the particles are passed through a specific acceleration chamber with electrostatic charging. This apparatus serves for the coating of glass substrates, aramid substrates, or carbon-fiber substrates for the production of prepregs from thermoplastic resins. Resins mentioned are polyethylene (PE), polypropylene (PP), polyetheretherketone (PEEK), polyether sulfone (PES), polyphenyl sulfone (PPS), polyimide (PI), polyamide (PA), polycarbonate (PC), polyethylene terephthalate (PET), polyurethane (PU), polyester, and fluoropolymers. The thermoplastic prepreg textiles produced therefrom exhibit inherent toughness, good viscoelastic damping behavior, unrestricted shelf life, good chemicals resistance, and recyclability.

The prepreg process has the disadvantage that specifically in the short-run sector the production of a prepreg and the subsequent pressing to give a fiber-composite system is very time-consuming and expensive. Changeovers between different types of laid scrim are moreover difficult.

Another possibility, alongside the production of fiber-composite components from prefabricated prepregs, is the processing of a thermoplastic matrix in the composite with fiber-reinforced materials. In what is known as the film-stacking process, layers of the matrix material (mostly as foil) and of the fiber layer (laid scrim, woven fabric, nonwoven) are alternately placed into a pressing mold. The pressing mold is heated above the melting point of the matrix material. During the press procedure, the molten synthetic polymer penetrates through the fiber layer. The film-stacking process features high flexibility in respect of the composite material that can be produced. The fiber content is varied by varying the proportions of thermoplastic foils and fiber layers inserted. Various fiber layers and matrix materials can be combined as desired.

The layer structure requires that the thermoplastic matrix penetrates through the fiber layer. This represents a major disadvantage of this process, because when very dense fiber layers are used the pressures required in the press are very high, and there is an increase in the risk of defects where saturation is incomplete. Furthermore, very high operating temperatures have to be used in the film-stacking process, depending on the thermoplastic, in order to convert the matrix material to a low-viscosity state. The thermoplastic therefore has to be heated far above its melting point, subjected to the forming process, and then cooled.

DE-A 4104692 reports a cost-effective process for the production of fiber-composite components of good quality with thermoplastic matrix and sheet-like reinforcing fiber textiles by the film-stacking process.

Use of thermoplastics is disadvantageous in comparison with thermosets (e.g. polyurethane) because of reduced stiffness and compressive strength, and because of surface quality, and the problem that thermoplastics are susceptible to creep, in particular when exposed to long-term loads and elevated temperatures.

WO 2012/022683 describes fiber-composite components and a process for production of these. The polyurethane used to saturate the fiber layer is produced from a reaction mixture. The reaction mixture comprises, as essential constituent, one or more polyepoxides, alongside polyisocyanates, polyols, and optionally additives. The polyurethane disclosed in said application has the disadvantage of a shelf life that is not adequate for the production of prepregs, being characterized by way of example by a low glass transition temperature. This system moreover does not have the NCO value required for postcrosslinking to give finished components.

It was therefore an object of the present invention to provide fiber-composite components which have good stiffness and compressive strength (good mechanical properties) and good surface quality, and which can be produced in a simple manner and at low temperatures.

This object has been achieved via the resin films of the invention that have not been fully hardened, and by use of these for the production of the fiber-composite components of the invention.

The invention therefore provides resin films which are composed of polyurethane (matrix material) that has not been fully hardened, with an NCO value of from 8% by weight to 16% by weight, and that has a $T_g$-value below 40° C. (measured in accordance with DIN EN ISO 53765-A-20), where the polyurethane is obtainable from a reaction mixture composed of
  A) one or more di- and/or polyisocyanates from the group consisting of aromatic di- and/or polyisocyanates and polymeric homologs of these, and also blends thereof
  B) a polyol component made of one or more polyols with an average OH number of from 30 to 1000 mg KOH/g, having an average functionality of from 1.9 to 2.5
  C) one or more dianhydrohexitols
  D) one or more latent catalysts which are catalytically active at temperatures of from 50° C. to 100° C.
  E) optionally auxiliaries and/or additives, other than polyepoxides
where the initial viscosity of the reaction mixture at 40° C. is from 30 to 500 mPas (measured in accordance with DIN 53019), preferably from 70 to 250 mPas, particularly preferably from 70 to 150 mPas, and the ratio of the number of the NCO groups in component A) to the number of the OH groups in component B) is preferably from 1.35:1 to 10:1, particularly preferably from 1.4:1 to 5.0:1.

The resin films of the invention are produced from components A) to E), where the use of epoxides is not permitted (see also Comparative Example 2). If epoxides are used there is no possibility of obtaining storage-stable polyurethanes that have not been fully hardened.

The resin film of the invention is almost tack-free, and melts at low temperatures, and viscosity after melting here is low, and good wetting of the fiber layer is thus ensured. The resin film is moreover storage-stable at room temperature over a plurality of weeks. The resin film cures at low temperatures and within a short time, thus giving short cycle times.

Surprisingly, it has been found possible to produce resin films which are storage-stable, but still reactive (not fully hardened), based on polyurethane, using a reactive polyurethane system with high index, where the polyurethane resin films have extremely short hardening time, in contrast to thermoplastics. In comparison with the fiber-reinforced thermoplastics described in DE-A 4104692, the resin films of the invention have improved processing properties and shorter cycle times. Advantages are found in particular in the relatively low melting point of the resin film of the invention, and also in the relatively low processing pressures. Furthermore, very good fiber saturation is obtained with the resin film of the invention in combination with fiber layers, because the molten resin film has low viscosity. The resin film undergoes rapid full hardening when heated, and is unlike thermoplastics in that it does not have to be cooled again in the mold, where appropriate under pressure, in order to harden.

The invention further provides sheet-like fiber-composite components comprising at least one sheet-like fiber layer which comprises at least one polyurethane resin of the invention, where the resin(s) has/have been fully hardened.

The present invention further provides a process for the production of the resin films of the invention, which is characterized in that
  i) components B) to E) are mixed at temperatures from 40° to 80° C., preferably from 50° to 70° C., to produce a polyol formulation X,
  ii) the polyol formulation X from step i) is mixed with component A) at temperatures from 10° to 80° C. to produce a reactive mixture,
  iii) the reactive mixture from ii) is processed to give a partially cured resin film.

For the production of the fiber-composite components, it is preferable that the resin films are applied as foil or sheet to the sheet-like fiber layer. However, it is also possible to comminute the foil or sheet to give granulate, fibers, or powder and to apply the comminuted granulate, fibers, or powder uniformly to the sheet-like fiber layer.

The resin films of the invention can, as foil, be cut to a size corresponding to the shape of the fiber layer, before further processing.

The layer thickness of the resin films is preferably from 1 μm to 1 cm, preferably from 0.1 mm to 5 mm.

The invention further provides a process for the production of the fiber-composite components of the invention, which is characterized in that
  according to the invention one or more sheet-like fiber layers and one or more resin films produced are mutually superposed, preferably in alternation, and the at least one resin film is fully hardened at from 110° to 140° C. under a pressure of from 1 to 100 bar, preferably from 1 to 50 bar, particularly preferably from 1 to 10 bar, or in vacuo within a period of from 1 to 4 minutes, preferably from 1 to 3 minutes.

The viscosities are determined in accordance with DIN EN ISO 53019 (plate-on-plate).

The resin films of the invention, and the fiber-composite components produced therefrom, can be used in various applications in the field of the construction industry, the automobile industry, the aerospace industry, power engineering of (wind turbines), and in boatbuilding and shipbuilding.

The principle for the production of the resin films consists in firstly producing a reactive polyurethane composition from the individual components A), B), C), D), and E). Components B), C), D), and E) are mixed in advance at from 40 to 80° C. to give a polyol formulation. The homogeneous mixture is then mixed at temperatures below 80° C. (preferably from 10° to 80° C.) with component A). This reactive polyurethane composition is then directly processed, e.g. by means of a doctor, preferably between two release foils, to give a resin film that has not been fully cured. There is no further crosslinking reaction due to heating of the polyurethane composition, because operations are carried out at room temperature. The storage-stable resin films can then be further processed subsequently to give fiber-composite components. The polyurethane resin films of the invention melt at slightly elevated temperatures to give a very low-viscosity liquid, and very good subsequent impregnation of the fiber layer can therefore be achieved.

Unlike the reaction mixtures used in DE-A 102010029355, the polyurethane reaction mixtures used in the invention require neither external blocking agents nor blocked isocyanate components. The resin films used in the invention can provide good fiber saturation and rapid hardening in the fiber composite at low temperatures. They thus permit rapid manufacture of the fiber-composite components.

Another advantage of the reaction systems used in the invention is that use of aromatic polyisocyanates gives fiber-composite components with high glass transition temperatures of more than 130° C., and that hardening is possible at low temperatures. In contrast to thermoplastics, the resin films have a low softening point or melting point, thus ensuring easy processing, i.e. advantageous melt flow, and at the same time a high glass transition temperature. In contrast, the processing of thermoplastics requires very high pressures and temperatures.

The resin films produced in the invention moreover have a very long shelf life of a plurality of weeks at room temperature. The resin films are almost tack-free, and can therefore be further processed in a simple manner.

The NCO value of the polyurethane that has not been fully hardened gives the proportion by weight of unreacted isocyanate groups in the polyurethane. The NCO value is determined over a period of a plurality of weeks. This NCO value is moreover an indicator of the shelf life of the resin films.

The NCO value of the storage-stable resin films is determined weekly over a period of 7 weeks. The NCO value of the resin films of the invention is in the range from 8% by weight to 16% by weight, preferably from 10% by weight to 16% by weight, and very particularly preferably from 10% by weight to 14% by weight. The NCO value of the resin films of the invention changes only very little over a period of 7 weeks, even without addition of external blocking agents or what are known as stoppers. The NCO value is determined in accordance with DIN EN ISO 14896:2009-07 Method A.

Operations for the production of the fiber-composite components can by way of example use the discontinuous film-stacking process, using a press that operates in cycles. Prior to complete crosslinking, the resin films and fiber layers can preferably be cut to size, and where appropriate stitched or otherwise fixed. The press is then charged either with a stack of resin films and of sheet-like fiber layers or with an individual layer made of resin film and of fiber layer. The press is then closed and heated, and the pressing process is carried out at superatmospheric pressure or atmospheric pressure, or where appropriate with application of vacuum. For the purposes of the present invention, this procedure for the production of the fiber-composite components takes place by way of example in a press at temperatures below 140° C., preferably from 110° to 140° C., particularly preferably from 110° to 135° C., as required by hardening time. The resultant composite component is then removed from the mold.

During the processing of the resin films to give the fiber-composite components (e.g. via pressing at elevated temperatures), very good impregnation of the fiber layer is achieved by virtue of the melting of the resin film to give a low-viscosity resin-film melt, before the full crosslinking reaction at elevated temperatures leads to full curing of the resin film. It is preferable that a release agent is provided to the mold cavity prior to pressing to give the fiber-composite component. It is possible to introduce other protective or decorative layers, for example one or more gelcoat layers, into the mold before the fiber layers and/or the resin films are introduced.

Particular preference is given to a fiber-composite component which comprises, in the fiber layer, a polyurethane obtainable from 50 to 80% by weight, preferably from 65 to 75% by weight, of polyisocyanates (A), from 15 to 30% by weight, preferably from 18 to 25% by weight, of polyols (B), from 5 to 15% by weight, preferably from 8 to 12% by weight, of dianhydrohexitols (C), from 0.1 to 3% by weight, preferably from 0.3 to 1.2% by weight, of catalyst (D), and from 0 to 3% by weight, preferably from 0.1 to 0.5% by weight, of additives (E), where the sum of the proportions by weight of the components is 100% by weight.

The fiber layer is preferably composed of fibrous material made of glass, carbon, synthetic polymers, of metal fibers, natural fibers, or mineral fiber materials, such as basalt fibers, or of ceramic fibers, or of mixtures thereof.

The proportion of fiber in the fiber-composite part is preferably more than 45% by weight, particularly preferably more than 50% by weight, based on the total weight of the fiber-composite component.

The usual aromatic di- and/or polyisocyanates are used as polyisocyanate component A). Examples of these suitable polyisocyanates are phenylene 1,4-diisocyanate, tolylene 2,4- and/or 2,6-diisocyanate (TDI), naphthylene 1,5-diisocyanate, diphenylmethane 2,2'- and/or 2,4'- and/or 4,4'-diisocyanate (MDI), and/or higher homologs (pMDI), 1,3- and/or 1,4-bis(2-isocyanatoprop-2-yl)benzene (TMXDI), 1,3-bis(isocyanatomethyl)benzene (XDI). It is preferable to use, as isocyanate, diphenylmethane diisocyanate (MDI), and in particular a mixture of diphenylmethane diisocyanate and polyphenylene polymethylene polyisocyanate (pMDI). The mixtures of diphenylmethane diisocyanate and polyphenylene polymethylene polyisocyanate (pMDI) have a preferred monomer content of from 60 to 100% by weight, preferably from 70 to 95% by weight, particularly preferably from 80 to 90% by weight. The NCO content of the polyisocyanate used should preferably be above 25% by weight, with preference above 30% by weight. The viscosity of the isocyanate should preferably be ≤250 mPas (at 25° C.), with preference ≤100 mPas (at 25° C.), and with particular preference ≤30 mPas (at 25° C.).

If a single polyol is added, the OH number of component B) gives the OH number thereof. In the case of mixtures, the OH number of the mixture is stated. This value can be determined with reference to DIN EN ISO 53240.

The average OH number of the polyol component (polyol or polyol mixture) B) is from 30 to 1000 mg KOH/g, preferably from 50 to 300 mg KOH/g, and particularly preferably from 60 to 250 mg KOH/g. The average functionality of the polyol component used is preferably from 1.9 to 2.5.

It is possible in the invention to use polyether polyols, polyester polyols, or polycarbonate polyols as polyol component B), preference being given to polyester polyols. Examples of polyester polyols that can be used in the invention are condensates of 1,4-butanediol, ethylene glycol, and adipic acid.

Polyol component B) can also comprise fibers, fillers, and polymers.

Dianhydrohexitols can by way of example be produced via elimination of two molecules of water from hexitols, e.g. mannitol, sorbitol, and iditol. These dianhydrohexitols are known as isosorbide, isomannide, and isoidide, and have the following formula:

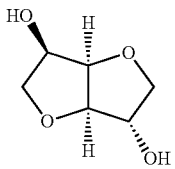 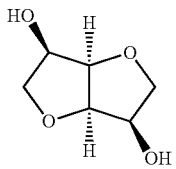 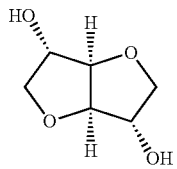

Isosorbide, 1,4:3,6-dianhydro-D-glucitol:    Isomannide, 1,4:3,6-dianhydro-D-mannitol:    Isoidide, 1,4:3,6-dianhydro-L-iditol:

Particular preference is given to isosorbide. Isosorbide is obtainable by way of example as Polysorb® P from Roquette, or as Addolink® 0312 from Rhein Chemie. It is also possible to use mixtures of the abovementioned compounds.

As latent catalysts D) it is preferable to use catalysts which are catalytically active in the range from 50° to 100° C. Examples of typical latent catalysts are blocked amine and amidine catalysts from the producers Air Products (e.g. Polycat® SA-1/10, Dabco KTM 60) and Tosoh Corporation (e.g. Toyocat® DB 2, DB 30, DB 31, DB 40, DB 41, DB 42, DB 60, DB 70). However, it is also possible to use any of the other, typical latent catalysts from polyurethane chemistry with what is known as a switch temperature of from 50° C. to 100° C.

Auxiliaries and/or additives E) can optionally be added. These are by way of example deaerators, antifoams, release agents, fillers, flow aids, organic or inorganic dyes, blowing agents, and reinforcing materials. Other known additives and additions can be used if necessary. Polyepoxides are not used.

Fiber material used can be sized or unsized fibers, for example glass fibers, carbon, metal fibers (e.g. steel fibers or iron fibers), natural fibers, aramid fibers, polyethylene fibers, basalt fibers, or carbon nanotubes (CNTs). Carbon fibers are particularly preferred. These fibers can be used as short fibers of length from 0.1 to 50 mm. Preference is given to continuous-filament-fiber-reinforced composite components obtained by using continuous fibers. The arrangement of the fibers in the fiber layer can be unidirectional, random, or woven. In components with a fiber layer made of a plurality of sublayers, there may be sublayer-to-sublayer fiber orientation. It is possible here to produce unidirectional fiber layers, cross-laid layers, or multidirectional fiber layers, where unidirectional or woven sublayers are mutually superposed. Particular preference is given to semifinished fiber products in the form of fiber material which is by way of example woven fabrics, laid scrims, braided fabrics, mats, nonwovens, knitted fabrics, or 3D semifinished fiber products.

The fiber-composite components of the invention can be used by way of example for the production of bodywork components of automobiles, or in aircraft construction, or rotor blades of wind turbines, for the production of components for construction of buildings or of roads (e.g. manhole covers), and of other structures exposed to high loads.

The resin films of the invention can be used in various applications in the field of the construction industry, the automobile industry, the aerospace industry, power engineering (e.g. wind turbines), and in boatbuilding and shipbuilding.

The resin films of the invention can also be used as hot-melt adhesives, e.g. in the packaging industry and clothing industry, electronics, furniture industry and timber industry, glass industry, and in the shoe industry.

The invention will be explained in more detail with reference to the examples below.

Example 1:

Storage-stable resin films were produced from the systems of the invention made of polyisocyanates, polyols, additives, and latent catalysts, and were then hardened with a laid glassfiber scrim to give a fiber-composite component. These were compared not only with fiber-composite components based on prepregs made of reactive polyurethane systems made of internally blocked polyisocyanate and polyol but also with fiber-composite components based on thermoplastics.

21.3 g of component C) were mixed with 42.5 g of component B), 1.5 g of Toyocat® DB 40 and 0.66 g of component E) at 70° C. 137.5 g of Desmodur® VP.PU 60RE11 were then added, and the mixture was homogenized by a high-speed mixer. The storage-stable resin films were then produced by processing the polyurethane composition at room temperature by means of a doctor between two release foils, and storing the composition at room temperature. The NCO value of the prepreg was 14.8% after 24 hours. The two release foils were then removed, and the resin films were placed onto a laid glassfiber scrim to achieve about 55% by weight glassfiber content, based on the subsequent component. Three laid glassfiber scrims of this type and two resin film layers were mutually superposed in alternation to give a stack, and then placed into a press mold, and then pressed at 130° C. and 5 bar within a period of two minutes to give a fiber-composite component of thickness about 2.2 mm. The mechanical measurements were made on the test samples of the components. Glassfiber content was determined by ashing the test samples in accordance with DIN EN ISO 1172. Interlaminar shear resistance was determined in accordance with DIN EN ISO 3597-4.

Comparative Example 2:

10.4 g of component C) were mixed with 20.9 g of component B), 0.75 g of Toyocat® DB 40, 0.33 g of component E), and 106.8 g of Eurepox® 710 (bisphenol A epichlorohydrin resin with average molar mass ≤700 g/mol; epoxy equivalent from 183-189 g/eq; viscosity at 25° C.: from 10 000-12 000 mPas) at 70° C. 67.6 g of Desmodur® VP.PU 60RE11 were then added at room temperature, and the mixture was homogenized by a high-speed mixer. Directly after mixing, the viscosity increased to about 5000 mPas. The NCO value of the matrix was 4.9% after 60 minutes, and the matrix was solid.

The NCO/OH ratio gives the ratio of the number of NCO groups in polyisocyanate component A) to the number of OH groups in component B) and C).

Starting Compounds Used:

Component A): Desmodur® VP.PU 60RE11 (polyisocyanate from Bayer MaterialScience AG; mixture of diphenylmethane diisocyanate and polyphenylene polymethylene polyisocyanate; NCO-content 32.6% by weight; viscosity at 25° C.: 20 mPas)

Component B): linear polyester polyol made of adipic acid, ethylene glycol, and 1,4-butanediol, hydroxy number 86 mg KOH/g and functionality 2, viscosity at 25° C.: 250±50 mPas Component C): isosorbide (Addolink® 0312 from Rhein Chemie, hydroxy number 768 mg KOH/g, melting point from 60° C. to 63° C.)

Component D): Toyocat® DB 40: latent catalyst (blocked amine) from TOSOH Corporation Component E): internal release agent Edenor® Ti 05 from Cognis Deutschland, acid number 200 mg KOH/g, functionality 1

Glassfiber textile: HPT 1040-E0/3AC11, 90°/0° from SGL KÜMPERS GmbH & Co. KG, weight per unit area 1036 g/m²

Test Equipment and Standards Used:
- DSC: DSC Q 20 V24.8 Build 120 from Texas Instruments
- Viscosimeter: MCR 501 from Anton Paar
- DIN EN ISO 53019 (d/dt=60 1/s): d/dt=shear rate
- DIN EN ISO 53765-A-20: A-20=determination of glass transition temperature with temperature change 20 kelvins/second
- DIN EN ISO 14896:2009-07 Method A: Method A=NCO value determination by means of titration The shelf life of the resin films was determined both on the basis of the glass transition temperature ($T_g$) by means of DSC studies and also on the basis of the NCO value [in % by weight]. The values in the table show that the crosslinkability of the resin films of the invention was not impaired by storage at room temperature over a period of 7 weeks.

The solidification time is considerably longer for the composite components based on prepregs (see data from DE-A 102010029355), whereas although the solidification time for the composite components based on thermoplastics is of the order of magnitude of that of the composite components of the invention, operations have to be carried out at very much higher temperatures (5 min. at 280° C.).

In comparative example 2 an appropriate quantity of Eurepox® 710 (bisphenol A epichlorohydrin resin with average molar mass ≤700 g/mol; epoxy equivalent from 183 to 189 g/eq; viscosity at 25° C.: from 10 000 to 12 000 mPas) was added to the system of the invention in inventive example 1 to give an equivalent ratio of NCO groups to epoxy groups of 1.1:1. Directly after mixing and homogenization, the viscosity of the reaction mixture increased to about 5000 mPas. After 30 seconds, the matrix had undergone almost full reaction, and higher temperatures therefore no longer caused melting. The glass transition temperature was 49° C. after as little as 24 hours, and the NCO value was below 4.4% by weight. It was therefore not possible to produce storage-stable resin films in the presence of epoxides.

TABLE 1

| Examples | Inventive Example 1 | Comparative Example 2 | * | ** (TPU) |
|---|---|---|---|---|
| NCO/OH equivalent ratio | 2.95:1 | 1.1:1 | 1:1 | — |
| NCO/epoxide equivalent ratio | | 1.1:1 | | |
| Viscosity at 40° C. (directly after mixing) [mPas]; measured in accordance with DIN EN ISO 53019 (d/dt = 60 1/s) | about 10 mPas | about 5000 | no homogeneous melt, since melting point of Fineplus PE 8078 > 60° C. | |
| Shelf life of resin film [after days]; measured on the basis of the glass transition temperature $T_g$ [° C.] in accordance with DIN EN ISO 53765-A-20 | after 7 days: −21 after 14 days: −19 after 21 days: −9 after 49 days: 0 | after 1 day: 49 | after 2 days: 50 after 17 days: 55 after 30 days: 56 after 47 days: 55 | |
| NCO value of prepreg [after days]; measured in accordance with DIN EN ISO 14896: 2009-07 Method A [% by weight] | after 1 day: 14.8 after 7 days: 13.2 after 14 days: 12.9 after 21 days: 12.8 after 35 days: 12.1 after 42 days: 11.9 after 49 days: 11.7 | after 1 day: about 4.4 | | |
| Glass transition temperature of hardened matrix ($T_g$) [° C.] (without glass fiber) in accordance with DIN EN ISO 53765-A-20 | about 146 | about 60 | | |
| Solidification time | 2 min at 130° C. | 30 sec at room temperature | 30 min; during this time the temperature is raised from 90° C. to 170° C. | 5 min at 280° C. |
| Glass fiber content [% by weight] in accordance with DIN EN ISO 1172 | 55 | — | >50 | 60 |
| Interlaminar shear resistance 0° direction (short beam) [N/mm²] in accordance with DIN EN ISO 3597-4 | 52 | — | 41 | 48 |

Comparative data from DE-A 102010029355 (*) and DE 4104692 A1 (**)

What is claimed is:

1. A resin film comprising a polyurethane that has not been fully hardened, wherein the polyurethane has an NCO value of from 8% by weight to 16% by weight, and a $T_g$-value below 40° C. measured in accordance with DIN 53765-A-20, and the polyurethane is obtained from a reaction mixture comprising
   A) one or more di- and/or polyisocyanates selected from the group consisting of aromatic di- and/or polyisocyanates and polymeric homologs thereof, and blends thereof,
   B) a polyol component comprising one or more polyols having an average OH number of from 30 to 1000 mg KOH/g measured in accordance with DIN EN ISO 53240, and an average functionality of from 1.9 to 2.5,
   C) one or more dianhydrohexitols,
   D) one or more latent catalysts which are catalytically active at temperatures of from 50° C. to 100° C., and
   E) optionally auxiliaries and/or additives, other than polyepoxides;
   where the initial viscosity of the reaction mixture at 40° C. is from 30 to 500 mPas measured in accordance with DIN 53019, and the ratio of the number of the NCO groups in component A) to the number of the OH groups in component B) is from 1.35:1 to 10:1.

2. The resin film according to claim 1, wherein the amount of component C) present is from 5 to 15% by weight, based on components A) to E).

3. A fiber-composite component comprising at least one resin film according to claim 1 and at least one fiber layer in the form of a sheet, wherein the resin film has been fully hardened.

4. The fiber-composite component according to claim 3, wherein the fiber layer comprises a fibrous material made of glass, carbon, synthetic polymers, metal fibers, natural fibers, mineral fibers, ceramic fibers, or mixtures thereof.

5. A process for the production of a resin film according to claim 1, wherein
   i) components B) to E) are mixed at temperatures from 40° to 80° C., to produce a polyol formulation X,
   ii) the polyol formulation X from step i) is mixed with component A) at temperatures from 10" to 80° C. to produce a reactive mixture,
   iii) the reactive mixture from ii) is processed to give a partially cured resin film.

6. The process according to claim 5, wherein components B) to E) are mixed at temperatures from 50° to 70° C.

7. The process according to claim 5, wherein the reactive mixture during processing in iii) is contained between two release foils.

8. A process for the production of fiber-composite components according to claim 3, wherein
   one or more partially cured resin films and one or more fiber layers are mutually superposed, and the one or the more resin films are hardened at temperatures from 110° to 140° C. under pressures from 1 to 100 barr or in vacuo for 1 to 4 minutes;
   wherein the one or more partially cured resin films is produced by the following process:
   (i) mixing the following components at temperatures from 40° to 80° C., to produce a polyol formulation X:
      a polyol component comprising one or more polyols having an average OH number of from 30 to 1000 mg KOH/g measured in accordance with DIN EN ISO 53240, and an average functionality of from 1.9 to 2.5,
      one or more dianhydrohexitols,
      one or more latent catalysts which are catalytically active at temperatures from 50° C. to 100° C., and
      optionally auxiliaries and/or additives, other than polyepoxides;
   ii) mixing the polyol formulation X from step i) with one or more di- and/or polyisocyanates selected from the group consisting of aromatic di- and/or polyisocyanates and polymeric homologs thereof, and blends thereof, at temperatures from 10° to 80° C. to produce a reactive mixture,
   iii) processing the reactive mixture from ii) to give a partially cured resin film.

9. An adhesive layer positioned between layers made of glass, synthetic polymer, and/or metal, wherein the adhesive layer is the fiber-composite of claim 3.

10. A structural component comprising the fiber-composite of claim 3, wherein the structural component is selected from components of automobiles or aircraft, components for construction of buildings or roads, or rotor blades of wind turbines.

* * * * *